June 3, 1930.  W. E. WILLIAMS  1,761,284
FELLY PORTION OF WHEELS
Filed June 5, 1922
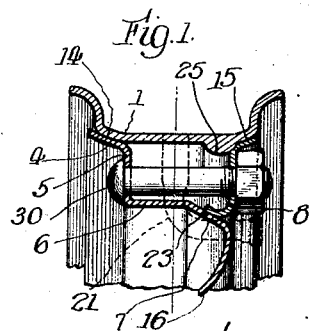
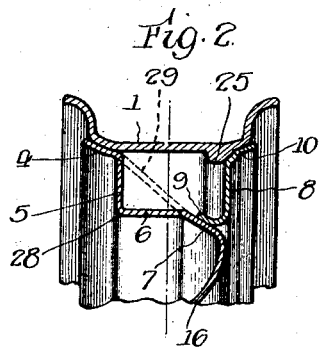
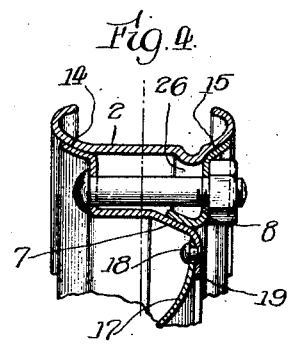
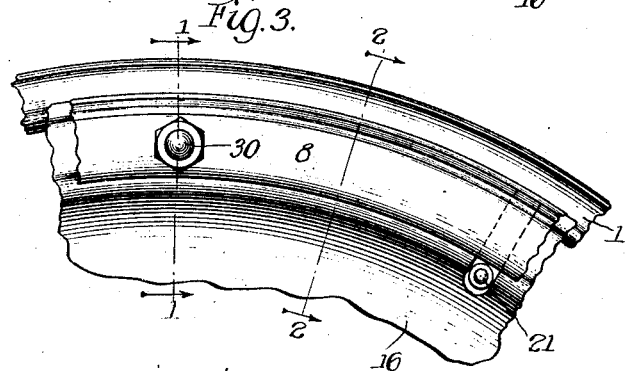
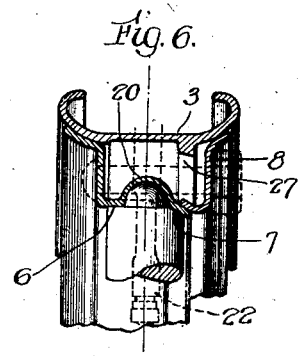
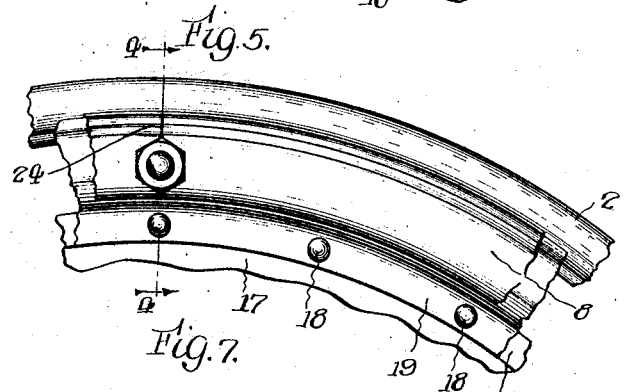
Witness:
A. J. Hauser
Inventor:
W. E. Williams Patented June 3, 1930

1,761,284

UNITED STATES PATENT OFFICE

WILLIAM ERASTUS WILLIAMS, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN

FELLY PORTION OF WHEELS

Application filed June 5, 1922. Serial No. 565,870.

My invention relates to that class of wheels with which there is used rims for rubber tires of various sorts, and chiefly used in the automobile service.

The object of my invention is to provide a felly for a wheel of disk, wood spoke, or wire spoke type, having a metal felly adapted to carry any of various types of demountable rims. The felly may be an integral part of a metal disk, or may be attached to such disk, or to a spoke wheel, both wire and wood spoke types being illustrated.

Reference will be had to the accompanying drawing, in which

Fig. 1 is a section of a disk wheel, on the line 1—1, Fig. 3.

Fig. 2 is a similar section on the line 2—2, Fig. 3.

Fig. 3 shows a portion of the wheel looking from the right hand side, in Fig. 1.

Fig. 4 is a section on the line 4—4, Fig. 5, the felly being shown as non-integral with the disk.

Fig. 5 is a view analogous to Fig. 3, but showing the wheel of Fig. 4.

Fig. 6 is a section similar to Fig. 1 but showing a section in the plane of a wood spoke.

Fig. 7 is a section similar to the sections of Figs. 3, 5, showing the wheel of Fig. 6.

Fig. 8 is a section like that of Fig. 6, but with the cutting plane passed between the spokes.

Figure 9 is a transverse section of my felly portion showing in diagrammatical lines the nature of the wedge ring used to hold the demountable rim on the felly.

In these views, 1 designates a common straight side type of rim usable on unlike fellies, 2 (Figs. 4, 5, 9) a rim of the clincher type having a similar body, and 3 (Figs. 6, 7, 8) a clincher rim with a different body. All these are usable on seats like those of Figs. 1, 2, 3.

It is desirable to make the felly seats adapted to receive as wide a variation as possible in the different styles of rims found generally on the market, and the constructions that I have shown are aimed at accommodating the largest range of rim designs practicable with the same form of felly seats.

My felly portion in general terms may be said to be composed of a Z bar fixed section in combination with a Z bar wedge forming a detachable ring or rim section, and the two Z-bar pieces serving as a felly, whether one is integral with the disk or both together form an independent felly.

Perhaps the most desirable way of demounting a rim from a felly, and that most generally used where severe service is required, consists in using a felly portion, or a felly band portion, having an inclined bearing surface for one side of the demountable rim, and with a wedge ring portion interposed between the demountable rim and the felly, or felly band portion, and means for clamping this wedge ring in place. And the wedge ring which I have shown and prefer to use, is a full and complete wedge in so far as its action and service are concerned but by the Z-bar construction I omit wedge portions which if present would not be material.

In the drawing, 4 indicates the outer inclined bearing surface of the felly portion which is merged into the straight stiffening vertical flange portion 5, this in turn is merged into a horizontal flange portion 6, and this into an inclined portion 7, forming the wedge seat of my Z bar wedge ring 8, which is provided with the inclined seat 9, which seats upon the inclined seat 7, of the felly portion. This Z bar wedge ring 8, is provided with the outer surfaces 9, 10, if produced, would meet in a circle at 11, as indicated in Fig. 9, wherein 8 is the middle part of the ring and the dotted lines 12, 13, indicate the directions of the two conical wedge-like surfaces. Thus it will be seen that the inclined portion 4, of my felly portion together with the inclined portion 10, of my wedge ring, are adapted to bear on the corners 14 and 15 of the various demountable rims without much regard to the seats on the inside of these rims that were specially prepared for different types of rims and felly seats, indicated by 25, 26 and 27. The portions 14 and 15 are substantially standard for the various different tires of the same size, and these portions of the rims are really about the only surfaces on a demountable rim that approach a universal shape, and my felly portion composed of the main Z bar section and the wedge Z bar ring are best adapted to meet this requirement of anything with which I am familiar.

In holding the Z bar wedge ring in place I prefer to use a series of bolts 30, which pass through apertures in the surface 8, of the wedge ring. In place of these bolts I may, if desired, use clips held in place by a series of bolts located inside toward the center of the felly portion proper.

In Figures 1 and 2, 16 indicates the disk or web portion of the wheel, and this disk may be tapered in cross sections or have a uniform section as may be desired by the wheel maker, and the hub connection of the disk may be made to suit the various different shapes without necessarily changing the shape of the felly portion.

In Figure 4, the disk is indicated by 17, and is secured by rivets 18, to a flange 19, of my felly portion. In cases where the felly portion is integral with the disk, the flange 19 is a part of the body of the disk.

Where spokes are used, the sections are shown in Figures 6, 7, and 8, and then the inclined portion 7 serves as one edge of the Z bar section of the main felly portion. Spoke sockets 20 are embossed in the portion 6 of the felly portion to suit an ordinary type of spoke connection with what is known as the metal felly. Where wire spokes are used, which I have not shown, there will be embossed in this portion 6, suitable seats for terminals of the wire spokes.

When the felly portion is used with a spoked wheel it may be desirable to stiffen the portion 7 by the flange 19, shown in Figure 4, but not necessarily so, for the reason that the Z bar wedge ring through the depth of its vertical flange or body, 8, is such a stiff member with respect to radial displacement that it will distribute its load over such a large segment of the main felly portion as not to overload any one spot of the inclined seat 7, whereby this additional reinforcement is rarely desirable.

The Z bar wedge ring 8, is what is known as a split ring being divided transversely at one point indicated by 24 in Figure 5, otherwise being integral in like manner to wedge rings heretofore used.

In relation to the air valve used in pneumatic tires, I have shown on dotted lines 21 what is known as an angle air valve, and I have shown on dotted lines 22, in Figure 6, a straight air valve. When the angle air valve is used, as shown by dotted lines in Figure 1, I may when desired notch out the disk portion indicated by 23, which is included between the points cut by the angle air valve at the location of the air valve only, and thus permit the tire rim with its inflated tire to be applied directly sidewise without having to direct the air valve through an aperture in mounting and demounting a tire rim.

I may if desired, so shape my Z bar felly section, as to eliminate the corners 28, see Figure 2, and extend the metal across on the dotted lines 29, and then accommodate the clamping bolts 30, with inclined heads or other means of fastening, and then thus save a little weight if desired.

What I claim is:—

1. In a device of the class described, a felly portion shaped to simulate a Z-bar in combination with a Z bar wedge ring provided with an inclined flange adapted to seat on one leg of the felly portion and an inclined flange adapted to seat on the surface on the rim, with a suitable demountable rim adapted to be held by the said felly and wedge ring.

2. In a device of the class described, a felly portion of a disk wheel having two bearing surfaces one of them for a seat for the rim the other for a seat for a wedge ring in combination with a wedge ring consisting of a primarily plane annular sheet having its outer marginal portion bent laterally to form an outwardly divergent flange, and its inner marginal portion bent oppositely to form an inwardly convergent flange, and means for holding said wedge ring in place.

Signed at Chicago in the county of Cook and State of Illinois, this 3d day of June, 1922.

WILLIAM ERASTUS WILLIAMS.